(12) United States Patent
Doujou et al.

(10) Patent No.: US 12,228,708 B2
(45) Date of Patent: Feb. 18, 2025

(54) OPTICAL SYSTEM INCLUDING CEMENTED LENSES, IMAGING APPARATUS INCLUDING THE SAME, AND MOVING APPARATUS INCLUDING THE SAME

(71) Applicant: CANON KABUSHIKI KAISHA, Tokyo (JP)

(72) Inventors: Naoto Doujou, Tochigi (JP); Kazuhiko Kajiyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 18/182,903

(22) Filed: Mar. 13, 2023

(65) Prior Publication Data

US 2023/0296881 A1    Sep. 21, 2023

(30) Foreign Application Priority Data

Mar. 17, 2022   (JP) ................. 2022-042500

(51) Int. Cl.
*G02B 27/00* (2006.01)
*B60Q 9/00* (2006.01)
*B60T 7/22* (2006.01)
*B60T 8/171* (2006.01)
*B60T 8/172* (2006.01)
*G02B 13/00* (2006.01)
*G06V 20/58* (2022.01)
*G08G 1/16* (2006.01)

(52) U.S. Cl.
CPC .......... *G02B 13/006* (2013.01); *B60Q 9/008* (2013.01); *B60T 7/22* (2013.01); *B60T 8/171* (2013.01); *B60T 8/172* (2013.01); *G02B 27/0025* (2013.01); *G06V 20/58* (2022.01); *G08G 1/16* (2013.01); *B60T 2201/022* (2013.01)

(58) Field of Classification Search
None
See application file for complete search history.

(56) References Cited

U.S. PATENT DOCUMENTS

| | | | |
|---|---|---|---|
| 8,179,617 B2 * | 5/2012 | Sugita | G02B 13/04 359/753 |
| 8,223,439 B2 * | 7/2012 | Okumura | G02B 15/177 359/740 |
| 8,638,506 B2 * | 1/2014 | Eguchi | G02B 9/12 359/784 |

(Continued)

FOREIGN PATENT DOCUMENTS

| | | | | |
|---|---|---|---|---|
| CN | 108169878 A | * | 6/2018 | ......... G02B 13/0015 |
| CN | 111751969 A | * | 10/2020 | ........... G02B 13/009 |

(Continued)

*Primary Examiner* — Kevin R Steckbauer
(74) *Attorney, Agent, or Firm* — Canon U.S.A., Inc., IP Division

(57) ABSTRACT

An optical system includes an aperture stop closest to an object and a plurality of lenses. The plurality of lenses includes a first positive lens convex toward an object side, a first negative lens convex toward the object side, a first cemented lens, and a second cemented lens arranged consecutively in this order from the object side to an image side. The first cemented lens and the second cemented lens each include a negative lens concave toward the object side and a positive lens cemented to the negative lens, and the negative lens and the positive lens are arranged in this order from the object side to the image side.

20 Claims, 10 Drawing Sheets

(56) References Cited

U.S. PATENT DOCUMENTS

| | | | |
|---|---|---|---|
| 8,830,599 B2 * | 9/2014 | Kubota | G02B 13/04 359/793 |
| 9,128,275 B2 * | 9/2015 | Shimada | G02B 13/009 |
| 9,638,890 B2 * | 5/2017 | Tomioka | G02B 9/64 |
| 10,114,200 B2 * | 10/2018 | Ichikawa | G02B 27/0025 |
| 10,209,497 B2 * | 2/2019 | Noda | G02B 13/06 |
| 10,281,693 B2 * | 5/2019 | Yamahiro | H04N 23/957 |
| 10,302,918 B2 * | 5/2019 | Matsunaga | H04N 23/698 |
| 10,698,187 B2 * | 6/2020 | Tanaka | G02B 13/18 |
| 10,845,572 B2 * | 11/2020 | Ohashi | G02B 13/0045 |
| 10,845,579 B2 * | 11/2020 | Ichimura | G02B 13/02 |
| 10,866,390 B2 * | 12/2020 | Mori | G02B 13/18 |
| 10,983,315 B2 * | 4/2021 | Maetaki | G02B 15/1425 |
| 11,092,780 B2 * | 8/2021 | Mori | G02B 13/0035 |
| 11,294,158 B2 * | 4/2022 | Kawana | G02B 9/60 |
| 11,353,682 B2 * | 6/2022 | Kawamura | G02B 13/02 |
| 11,353,689 B2 * | 6/2022 | Matsunaga | G02B 15/143103 |
| 11,500,184 B2 * | 11/2022 | Suzuki | G02B 13/02 |
| 11,867,889 B2 * | 1/2024 | Miyashita | G02B 13/26 |
| 12,044,831 B2 * | 7/2024 | Doujou | G02B 9/62 |
| 12,050,364 B2 * | 7/2024 | Yokoya | G02B 13/06 |
| 12,066,598 B2 * | 8/2024 | Shinzato | G02B 9/12 |
| 12,066,603 B2 * | 8/2024 | Ichikawa | G02B 13/0045 |
| 2003/0072088 A1 * | 4/2003 | Obama | G02B 15/177 359/689 |
| 2006/0274433 A1 * | 12/2006 | Kamo | G02B 13/0095 359/793 |
| 2010/0027136 A1 * | 2/2010 | Ohashi | G02B 13/04 359/753 |
| 2010/0033848 A1 * | 2/2010 | Hatada | G02B 13/04 359/753 |
| 2011/0080647 A1 * | 4/2011 | Sugita | G02B 27/0062 359/675 |
| 2011/0090574 A1 * | 4/2011 | Harada | G02B 9/06 359/717 |
| 2011/0164324 A1 * | 7/2011 | Okumura | G02B 15/177 359/717 |
| 2012/0026608 A1 * | 2/2012 | Mori | G02B 13/005 359/761 |
| 2012/0069440 A1 * | 3/2012 | Harada | G02B 27/646 359/557 |
| 2012/0257100 A1 * | 10/2012 | Imaoka | G02B 9/14 348/E5.026 |
| 2013/0194488 A1 * | 8/2013 | Kubota | G02B 13/009 359/691 |
| 2013/0194681 A1 * | 8/2013 | Ohashi | G02B 9/64 359/738 |
| 2014/0016214 A1 * | 1/2014 | Kubota | G02B 13/04 359/738 |
| 2016/0085048 A1 * | 3/2016 | Tomioka | G02B 27/0025 359/755 |
| 2017/0108674 A1 * | 4/2017 | Ichikawa | G02B 5/005 |
| 2017/0168274 A1 * | 6/2017 | Inoue | G02B 15/177 |
| 2017/0254990 A1 * | 9/2017 | Noda | B60R 1/12 |
| 2018/0373001 A1 * | 12/2018 | Tanaka | G02B 13/18 |
| 2019/0121062 A1 * | 4/2019 | Ohashi | G02B 27/0037 |
| 2019/0146195 A1 * | 5/2019 | Ichimura | G02B 13/18 359/716 |
| 2019/0265439 A1 * | 8/2019 | Mori | G02B 13/18 |
| 2019/0265450 A1 * | 8/2019 | Maetaki | G02B 15/177 |
| 2019/0271830 A1 * | 9/2019 | Mori | G02B 13/0035 |
| 2020/0073096 A1 * | 3/2020 | Nagami | G02B 9/64 |
| 2020/0103647 A1 * | 4/2020 | Saito | G02B 13/0045 |
| 2020/0132964 A1 * | 4/2020 | Sekine | G02B 13/0045 |
| 2020/0132973 A1 * | 4/2020 | Matsunaga | G02B 13/006 |
| 2020/0310091 A1 * | 10/2020 | Kawana | G02B 15/177 |
| 2021/0011249 A1 * | 1/2021 | Yokoyama | G02B 9/60 |
| 2021/0048652 A1 * | 2/2021 | Suzuki | G02B 9/64 |
| 2021/0255439 A1 * | 8/2021 | Fujikura | G02B 13/04 |
| 2021/0263291 A1 * | 8/2021 | Miyashita | G02B 27/0025 |
| 2021/0341709 A1 * | 11/2021 | Kawamura | G02B 9/08 |
| 2022/0026688 A1 * | 1/2022 | Oe | G02B 9/64 |
| 2022/0057601 A1 * | 2/2022 | Nakatsuji | G02B 13/04 |
| 2022/0252840 A1 * | 8/2022 | Shinzato | G02B 13/0035 |
| 2022/0382015 A1 * | 12/2022 | Nishimura | G02B 9/34 |
| 2023/0076225 A1 * | 3/2023 | Doujou | G02B 13/0015 |
| 2023/0080794 A1 * | 3/2023 | Doujou | G02B 6/29367 348/148 |
| 2023/0161134 A1 * | 5/2023 | Fujisaki | G02B 9/04 359/717 |
| 2023/0213734 A1 * | 7/2023 | Iwamoto | G02B 13/0045 359/764 |
| 2023/0296862 A1 * | 9/2023 | Doujou | G08G 1/16 701/70 |
| 2023/0296881 A1 * | 9/2023 | Doujou | G02B 13/006 701/70 |
| 2023/0408796 A1 * | 12/2023 | Kajiyama | G06T 7/50 |
| 2024/0176095 A1 * | 5/2024 | Doujou | G06F 3/1423 |

FOREIGN PATENT DOCUMENTS

| | | | |
|---|---|---|---|
| CN | 112630934 A * | 4/2021 | |
| CN | 113031212 A * | 6/2021 | G02B 1/00 |
| CN | 115755334 A * | 3/2023 | G02B 13/0015 |
| CN | 111751969 B * | 9/2023 | G02B 13/009 |
| CN | 116774394 A * | 9/2023 | B60Q 9/008 |
| CN | 117233922 A * | 12/2023 | |
| EP | 2397880 A2 * | 12/2011 | G02B 13/0015 |
| EP | 3764146 A1 * | 1/2021 | G02B 13/04 |
| EP | 3812820 A1 * | 4/2021 | G02B 13/02 |
| EP | 4246200 A1 * | 9/2023 | B60Q 9/008 |
| EP | 3812820 B1 * | 7/2024 | G02B 13/02 |
| JP | 2017125978 A * | 7/2017 | |
| JP | 2020109493 A | 7/2020 | |
| JP | 2023037276 A * | 3/2023 | G02B 9/04 |
| JP | 2023037298 A * | 3/2023 | G02B 13/0015 |
| JP | 2023136685 A * | 9/2023 | B60Q 9/008 |
| JP | 2023138325 A * | 10/2023 | B60Q 9/008 |
| JP | 2023183790 A * | 12/2023 | B60Q 9/00 |
| WO | WO-2014155464 A1 * | 10/2014 | G02B 13/0045 |
| WO | WO-2018190014 A1 * | 10/2018 | G02B 13/0045 |
| WO | WO-2019131749 A1 * | 7/2019 | G02B 13/02 |
| WO | WO-2023243560 A1 * | 12/2023 | |
| WO | WO-2024116902 A1 * | 6/2024 | |
| WO | WO-2024166548 A1 * | 8/2024 | |

* cited by examiner

OPTICAL SYSTEM INCLUDING CEMENTED LENSES, IMAGING APPARATUS INCLUDING THE SAME, AND MOVING APPARATUS INCLUDING THE SAME

BACKGROUND

Technical Field

One disclosed aspect of the embodiments relates to an optical system and is suitable for, for example, imaging apparatuses such as digital still cameras, digital video cameras, in-vehicle cameras, cameras for mobile phones, monitoring cameras, wearable cameras, and medical cameras.

Description of the Related Art

There are demands for an optical system for use in imaging apparatuses that is small in size and provides high optical performance. A configuration with an aperture stop situated closest to an object side is known as a configuration for reducing diameters of lenses of an optical system. Japanese Patent Application Laid-Open No. 2020-109493 discusses an optical system that includes an aperture stop situated closest to an object side and a plurality of lenses situated closer to an image side than the aperture stop is.

It is known that correcting various aberrations is more difficult with an optical system with an aperture stop situated closest to an object side than with a Gaussian-type optical system with an aperture top situated between a plurality of lenses. According to Japanese Patent Application Laid-Open No. 2020-109493, the plurality of lenses has an aspherical surface in an attempt to correct various aberrations, but it is difficult to sufficiently reduce an f-number Fno (increase brightness) and, furthermore, it becomes more difficult to manufacture the lenses.

SUMMARY

According to an aspect of the embodiments, an optical system includes an aperture stop closest to an object and a plurality of lenses. The plurality of lenses includes a first positive lens convex toward an object side, a first negative lens convex toward the object side, a first cemented lens, and a second cemented lens arranged consecutively in this order from the object side to an image side. The first cemented lens and the second cemented lens each include a negative lens concave toward the object side and a positive lens cemented to the negative lens, and the negative lens and the positive lens are arranged in this order from the object side to the image side.

Further features of the disclosure will become apparent from the following description of exemplary embodiments with reference to the attached drawings.

DESCRIPTION OF THE EMBODIMENTS

Figure 1:
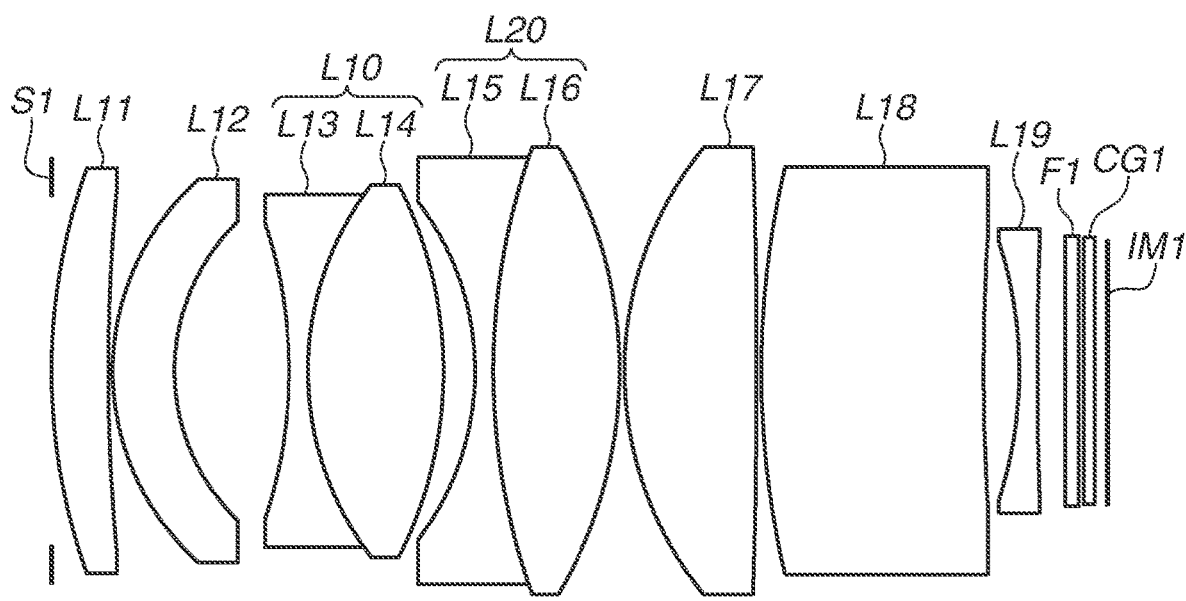
FIG. 1 is a schematic diagram illustrating a major portion of an optical system according to a first exemplary embodiment.

Various exemplary embodiments of the disclosure will be described below with reference to the drawings. The drawings may be illustrated on a scale different from a real scale for convenience. Further, identical components are given the same reference numeral in the drawings to omit redundant descriptions thereof. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, or transistors. For example, a switch is a circuit that turns on and turns off a connection. It can be implemented by a transistor circuit or similar electronic devices.

An optical system according to an exemplary embodiment of the disclosure includes an aperture stop situated closest to an object side and a plurality of lenses. The plurality of lenses includes a first positive lens convex toward the object side, a first negative lens convex toward the object side, a first cemented lens, and a second cemented lens arranged consecutively in this order from the object side to an image side. Further, the first cemented lens includes a negative lens concave toward the object side and a positive lens cemented to the negative lens, and the negative lens and the positive lens are arranged in this order from the object side to the image side. Further, the second cemented lens includes a negative lens concave toward the object side and a positive lens cemented to the negative lens, and the negative lens and the positive lens are arranged in this order from the object side to the image side. With the foregoing configuration, an optical system that is small in size and provides high optical performance is realized.

The optical system according to the exemplary embodiment of the disclosure is to satisfy at least the above-described configuration to produce an advantage of the disclosure and can have, for example, a configuration including a plurality of positive lenses, a configuration including a plurality of negative lenses, or a configuration including three or more cemented lenses. Each cemented lens is not limited to a cemented lens consisting of a single pair of a positive lens and a negative lens and can be a cemented lens consisting of three or more lenses. Further, optical elements that do not contribute to the image forming by the optical system, such as an optical filter and a cover glass, can be situated closer to the image side than a lens (final lens) situated closest to the image side among the lenses of the optical system is.

An optical system according to an exemplary embodiment will be described in detail below.

FIG. 1 is a schematic diagram illustrating a major portion of a cross section including an optical axis of an optical system according to a first exemplary embodiment.

In FIG. 1, the left-hand side is the object side (front side), and the right-hand side is the image side (rear side). The optical system according to the present exemplary embodiment is an image forming optical system that forms an image of an object (subject) (not illustrated) on an image plane IM1 by condensing light from the object. Specifically, an entire system of the optical system according to the present exemplary embodiment has positive refractive power. In a case where the optical system according to the present exemplary embodiment is applied to an imaging apparatus, an imaging surface (photosensitive surface) of an image sensor (photodetector) is situated at the position of the image plane IM1. The present exemplary embodiment intends a case where an ambient temperature at which the optical system is situated is a room temperature (25° C.).

The optical system according to the present exemplary embodiment includes an aperture stop S1, a first positive lens L11, a first negative lens L12, a first cemented lens L10, a second cemented lens L20, a second positive lens L17, a third positive lens L18, and a second negative lens L19 arranged in this order from the object side to the image side. The first cemented lens L10 consists of a negative lens L13 and a positive lens L14 arranged in this order from the object side to the image side. The second cemented lens L20 consists of a negative lens L15 and a positive lens L16 arranged in this order from the object side to the image side. The positive lens and the negative lens of each cemented lens are cemented together using a cement substance such as an adhesive. The second negative lens L19 is a final lens, and a wavelength selection filter F1 (band-pass filter) and a cover glass CG1 are situated on a closer side of the second negative lens L19 to the image side.

Next, a feature of the optical system according to the present exemplary embodiment will be described below.

The optical system according to the present exemplary embodiment has a configuration (front-stop type) in which the aperture stop S1, which determines an f-number Fno by limiting light from the object, is situated closest to the object side. Thus, the light limited by the aperture stop S1 enters all the lenses. This makes it possible to reduce the lenses in diameter and consequently reduce the size of the entire optical system.

In general, an optical system with a sufficiently small f-number Fno is demanded as an optical system for use in an imaging apparatus. This demand increases its significance especially in an optical system with a long focal length for use in an imaging apparatus for imaging a distant object. A Gaussian-type optical system with an aperture stop situated between a plurality of lenses is known as an optical system that is advantageous in reducing the f-number Fno. With the Gaussian-type optical system, the lenses are arranged highly symmetrically with respect to the aperture stop, and this makes it easier to correct various aberrations suitably even in a case where the f-number Fno is reduced. It is, however, difficult to reduce the size of the entire system of the Gaussian-type optical system compared to that of a front-stop type optical system.

For example, in a case where the position of the aperture stop of the Gaussian-type optical system is changed to a position closest to the object side, the lenses are no longer symmetric, so that it becomes difficult to correct various aberrations suitably.

Thus, according to the present exemplary embodiment, a front-stop type optical system is used while shapes and layout of lenses are devised to provide high optical performance. Specifically, the optical system according to the present exemplary embodiment has a configuration in which a first positive lens convex toward the object side, a first negative lens convex toward the object side, a first cemented lens, and a second cemented lens are arranged consecutively in this order from the object side to the image side and are situated closer to the image side than the aperture stop S1 is. Further, each cemented lens includes a negative lens concave toward the object side and a positive lens cemented to an image-side surface of the negative lens. Specifically, the first cemented lens L10 includes the negative lens L13 concave toward the object side and the positive lens L14 cemented to an image-side surface of the negative lens L13. Further, the second cemented lens L20 includes the negative lens L15 concave toward the object side and the positive lens L16 cemented to an image-side surface of the negative lens L15.

As described above, according to the present exemplary embodiment, a pair of a positive lens convex toward the object side and a negative lens convex toward the object side and two cemented lenses concave toward the object side are consecutively arranged in this order, thereby suitably arranging the lenses situated closer to the image side than the aperture stop S1 is. This makes it possible to correct various aberrations suitably with the lenses situated closer to the image side than the aperture stop S1 is while the aperture stop S1 is situated closest to the object side. Thus, the optical system according to the present exemplary embodiment realizes size reduction of the entire system and high optical performance simultaneously without using a great number of aspherical surfaces.

The optical system desirably satisfies the following inequalities (1) and (2):

$$0.15 < |f1/f2| < 1.05 \qquad (1), \text{and}$$

$$0.15 < |f34/f56| < 1.05 \qquad (2),$$

where f1 is a focal length of the first positive lens L11, f2 is a focal length of the first negative lens L12, f34 is a focal length of the first cemented lens L10, and f56 is a focal length of the second cemented lens L20. A focal length of each cemented lens is a combined focal length of a plurality of lenses of the cemented lens.

With the inequalities (1) and (2) satisfied, a relationship between the focal length ratio between the first positive lens L11 and the first negative lens L12 and the focal length ratio between the first cemented lens L10 and the second cemented lens L20 is suitably set. This makes it easy to correct coma aberration, spherical aberration, and field curvature suitably. In a case were the inequalities (1) and (2) are unsatisfied, the balance of the focal length ratios is lost, and it becomes difficult to correct various aberrations suitably.

Furthermore, inequalities (1a) and (2a) below are desirably satisfied. More desirably, inequalities (1b) and (2b) are satisfied.

$$0.20<|f1/f2|<1.00 \tag{1a},$$

$$0.20<|f34/f56|<1.00 \tag{2a},$$

$$0.25<|f1/f2|<0.95 \tag{1b, and}$$

$$0.30<|f34/f56|<0.90 \tag{2b}.$$

Further, f3 is a focal length of the negative lens L13 of the first cemented lens L10, f4 is a focal length of the positive lens L14 of the first cemented lens L10, f5 is a focal length of the negative lens L15 of the second cemented lens L20, and f6 is a focal length of the positive lens L16 of the second cemented lens L20. In this case, the optical system desirably satisfies the following inequalities (3) and (4):

$$-2.50<f3/f4<-0.40 \tag{3, and}$$

$$-2.50<f5/f6<-0.40 \tag{4}.$$

With the inequalities (3) and (4) satisfied, the focal length ratio between the negative lens L13 and the positive lens L14 of the first cemented lens L10 and the focal length ratio between the negative lens L15 and the positive lens L16 of the second cemented lens L20 are each set suitably, and it becomes easier to correct axial chromatic aberration, coma aberration, and spherical aberration suitably. In a case where the inequalities (3) and (4) are unsatisfied, the balance of the focal length ratios is lost, and it becomes difficult to correct various aberrations suitably.

Furthermore, inequalities (3a) and (4a) below are desirably satisfied. More desirably, inequalities (3b) and (4b) are satisfied.

$$-2.00<f3/f4<-0.50 \tag{3a},$$

$$-2.30<f5/f6<-0.50 \tag{4a},$$

$$-1.80<f3/f4<-0.60 \tag{3b, and}$$

$$-2.00<f5/f6<-0.60 \tag{4b}.$$

Further, ν3 is an Abbe number of the negative lens L13 of the first cemented lens L10 for the d-line (wavelength: 587.56 nm), ν4 is an Abbe number of the positive lens L14 of the first cemented lens L10 for the d-line (wavelength: 587.56 nm), ν5 is an Abbe number of the negative lens L15 of the second cemented lens L20, and ν6 is an Abbe number of the positive lens L16 of the second cemented lens L20. In this case, the optical system desirably satisfies the following inequalities (5) and (6):

$$2.0<|\nu3-\nu4|<18.0 \tag{5, and}$$

$$6.0<|\nu5-\nu6|<20.0 \tag{6}.$$

With the inequalities (5) and (6) satisfied, the difference in dispersion between the negative lens L13 and the positive lens L14 of the first cemented lens L10 and the difference in dispersion between the negative lens L15 and the positive lens L16 of the second cemented lens L20 are suitably set, and it becomes easier to correct axial chromatic aberration, coma aberration, and spherical aberration suitably. In a case where the inequalities (5) and (6) are unsatisfied, the balance of the differences in dispersion is lost, and it becomes difficult to correct various aberrations suitably.

Furthermore, inequalities (5a) and (6a) below are desirably satisfied. More desirably, inequalities (5b) and (6b) are satisfied.

$$3.0<|\nu3-\nu4|<15.0 \tag{5a},$$

$$8.0<|\nu5-\nu6|<18.0 \tag{6a},$$

$$4.0<|\nu3-\nu4|<14.0 \tag{5b, and}$$

$$9.0<|\nu5-\nu6|<17.0 \tag{6b}.$$

Further, N3 is a refractive index of the negative lens L13 of the first cemented lens L10 at the d-line, N4 is a refractive index of the positive lens L14 of the first cemented lens L10 at the d-line, N5 is a refractive index of the negative lens L15 of the second cemented lens L20, and N6 is a refractive index of the positive lens L16 of the second cemented lens L20. In this case, the optical system desirably satisfies the following inequalities (7) and (8):

$$0.015<|N3-N4|<0.500 \tag{7, and}$$

$$0.000<|N5-N6|<0.450 \tag{8}.$$

With the inequalities (7) and (8) satisfied, the difference in refractive index between the negative lens L13 and the positive lens L14 of the first cemented lens L10 and the difference in refractive index between the negative lens L15 and the positive lens L16 of the second cemented lens L20 are suitably set.

This makes it possible to reduce a Petzval sum of the entire optical system, and it becomes easy to correct field curvature and higher-order spherical aberration suitably. In a case where the inequalities (7) and (8) are unsatisfied, the balance of the differences in refractive index is lost, and it becomes difficult to correct various aberrations suitably.

Furthermore, inequalities (7a) and (8a) below are desirably satisfied. More desirably, inequalities (7b) and (8b) are satisfied.

$$0.020<|N3-N4|<0.400 \tag{7a},$$

$$0.001<|N5-N6|<0.300 \tag{8a},$$

$$0.025<|N3-N4|<0.300 \tag{7b, and}$$

$$0.002<|N5-N6|<0.250 \tag{8b}.$$

Desirably, lens surfaces (cemented surfaces) of the negative lens L13 and the positive lens L14 of the first cemented lens L10 that face each other are each convex toward the object side, and lens surfaces (cemented surfaces) of the negative lens L15 and the positive lens L16 of the second cemented lens L20 that face each other are each convex toward the object side. This configuration facilitates aberration correction and size reduction of the entire system.

Figure 2:
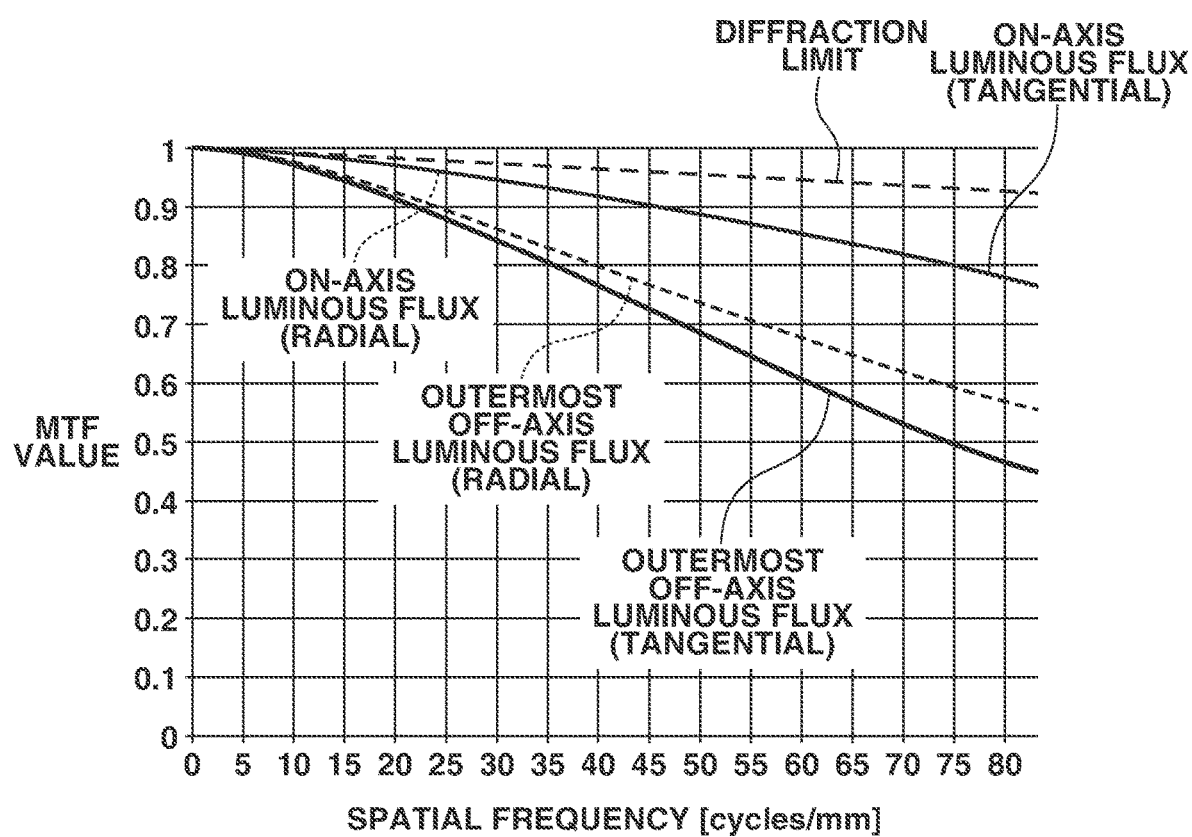
FIG. 2 is a modulation transfer function (MTF) chart of the optical system according to the first exemplary embodiment.

FIG. 2 is a diagram illustrating a modulation transfer function (MTF) curve of the optical system according to the present exemplary embodiment. In FIG. 2, a horizontal axis represents spatial frequencies [cycles/mm], and a vertical axis represents MTF values (contrast values). In FIG. 2, a curve indicating diffraction limits, a MTF curve for on-axis luminous flux (luminous flux with a central angle of view of 0°) to an on-axis image height, and a MTF curve for outermost off-axis luminous flux (luminous flux with a half angle of view of 15°) to an outermost off-axis image height are illustrated. According to the present exemplary embodiment, an image sensor with a pixel pitch of 3 μm is intended to be situated on the image plane IM1. As illustrated in FIG. 2, a minimum MTF value for a spatial frequency of 83 cycles/mm corresponding to a half value of the Nyquist frequency is about 45%, so that the optical system according to the present exemplary embodiment realizes suitable image forming performance.

Figure 3:
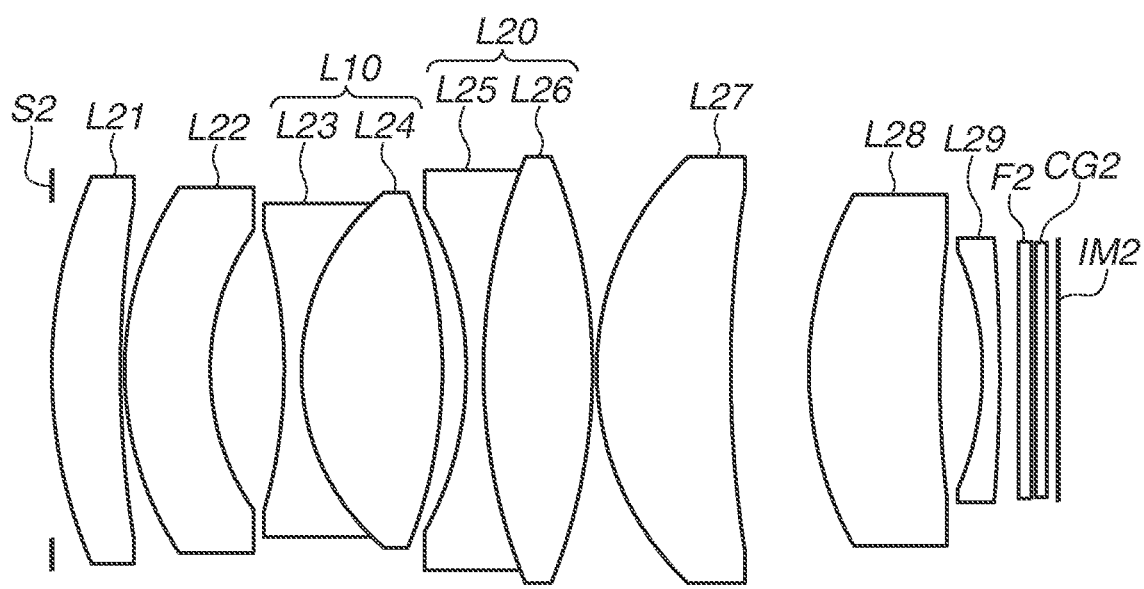
FIG. 3 is a schematic diagram illustrating a major portion of an optical system according to a second exemplary embodiment.

FIG. 3 is a schematic diagram illustrating a major portion of a cross section including an optical axis of an optical system according to a second exemplary embodiment.

As in the first exemplary embodiment, the present exemplary embodiment intends a case where an ambient temperature at which the optical system is situated is the room temperature (25° C.). Redundant descriptions of each component of the optical system according to the present exemplary embodiment that is identical to the corresponding component of the optical system according to the first exemplary embodiment described above are omitted.

The optical system according to the present exemplary embodiment includes an aperture stop S2, a first positive lens L21, a first negative lens L22, the first cemented lens L10, the second cemented lens L20, a second positive lens L27, a third positive lens L28, and a second negative lens L29 arranged in this order from the object side to the image side. The first cemented lens L10 consists of a negative lens L23 and a positive lens L24 arranged in this order from the object side to the image side. The second cemented lens L20 consists of a negative lens L25 and a positive lens L26 arranged in this order from the object side to the image side. Between the second negative lens L29, which is a final lens, and an image plane IM2 are arranged a wavelength selection filter F2 and a cover glass CG2.

Figure 4:
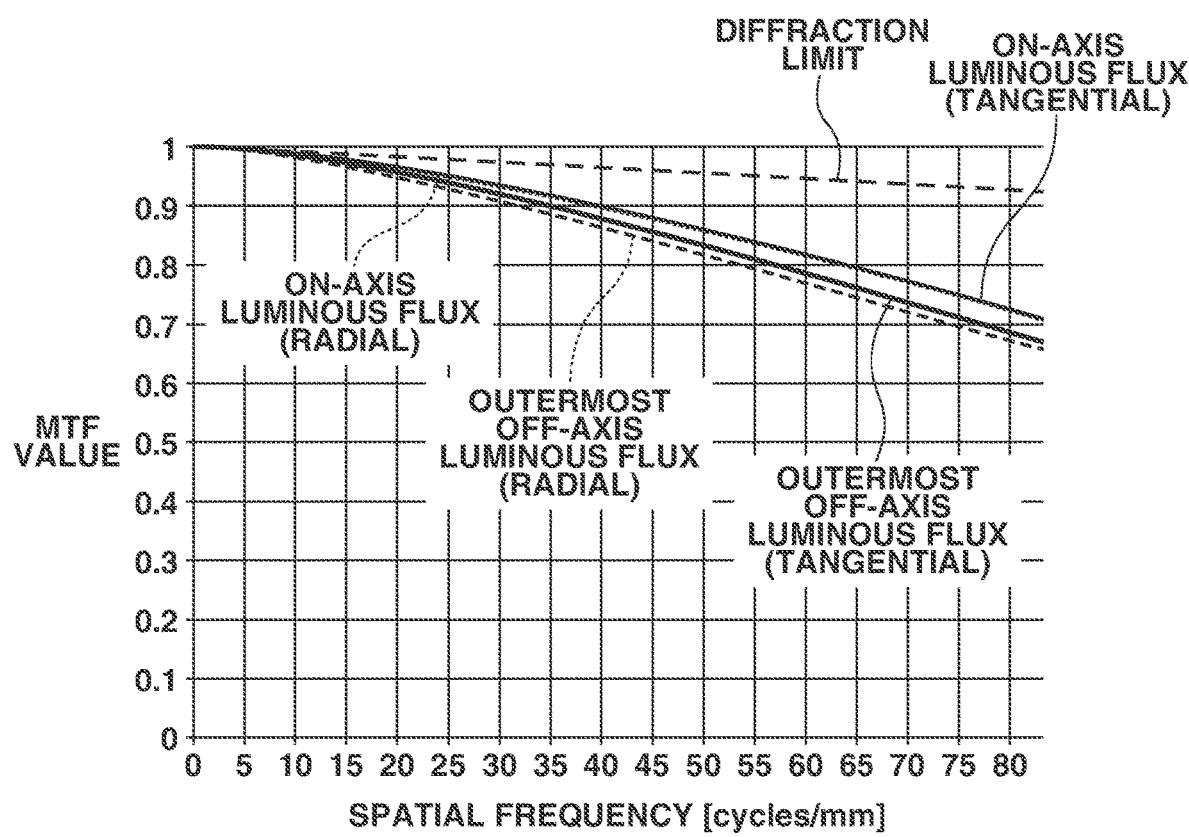
FIG. 4 is a MTF chart of the optical system according to the second exemplary embodiment.

FIG. 4 is a diagram illustrating a MTF curve of the optical system according to the present exemplary embodiment. As illustrated in FIG. 4, the minimum MTF value for a spatial frequency of 83 cycles/mm corresponding to the half value of the Nyquist frequency is about 66%, so that the optical system according to the present exemplary embodiment realizes suitable image forming performance.

Figure 5:
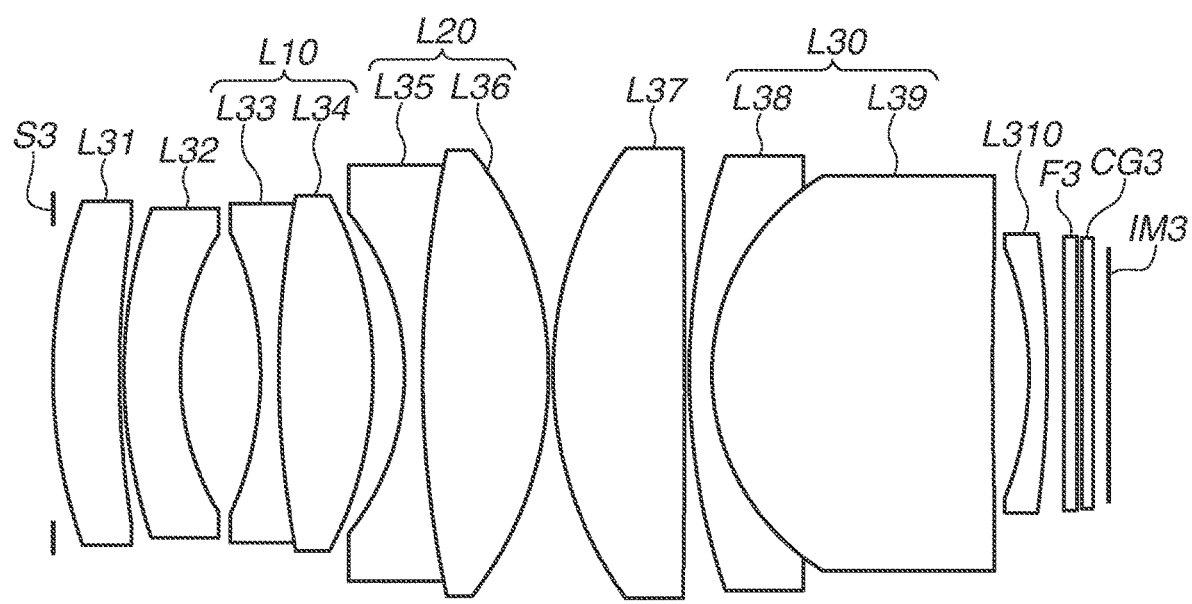
FIG. 5 is a schematic diagram illustrating a major portion of an optical system according to a third exemplary embodiment.

FIG. 5 is a schematic diagram illustrating a major portion of a cross section including an optical axis of an optical system according to a third exemplary embodiment.

Three cases where the ambient temperature at which the optical system is situated is the room temperature (25° C.), a low temperature (−40° C.), and a high temperature (85° C.) according to the present exemplary embodiment will be described below. Redundant descriptions of each component of the optical system according to the present exemplary embodiment that is identical to the corresponding component of the optical system according to the first exemplary embodiment described above are omitted.

The optical system according to the present exemplary embodiment includes an aperture stop S3, a first positive lens L31, a first negative lens L32, the first cemented lens L10, the second cemented lens L20, a second positive lens L37, a third cemented lens L30, and a second negative lens L310 arranged in this order from the object side to the image side. The first cemented lens L10 consists of a negative lens L33 and a positive lens L34 arranged in this order from the object side to the image side. The second cemented lens L20 consists of a negative lens L35 and a positive lens L36 arranged in this order from the object side to the image side. The third cemented lens L30 consists of a negative lens L38 convex toward the object side and a positive lens L39 cemented to an image-side surface of the negative lens L38. Between the second negative lens L310, which is a final lens, and an image plane IM3 are arranged a wavelength selection filter F3 and a cover glass CG3.

Unlike the optical systems according to the first and second exemplary embodiments, the optical system according to the present exemplary embodiment includes the third cemented lens L30. Further, according to the present exemplary embodiment, conditions of the lenses of the third cemented lens L30 such as relative positions, shapes, and materials are suitably set. This reduces changes in focal point position that originate from a change in ambient temperature, and it becomes easier to realize both temperature compensation and correction of various aberrations in the optical system. Instead of the third cemented lens L30, a lens group consisting of a pair of a negative lens and a positive lens that are adjacent to (separated from) each other can be used. A feature of the optical system according to the present exemplary embodiment will be described in detail below.

First, the optical system according to the present exemplary embodiment includes the negative lens L38 and the positive lens L39 as a pair of a negative lens and a positive lens for the temperature compensation. The optical system according to the present exemplary embodiment satisfies the following inequalities (9) and (10):

$$0.00 \leq DAB \leq 1.00 \tag{9}, \text{and}$$

$$0.80 \leq RA/RB \leq 1.20 \tag{10},$$

where DAB [mm] is a distance between the negative lens L38 and the positive lens L39 on the optical axis, and RA and RB are radii of curvature of lens surfaces of the negative lens L38 and the positive lens L39 that face each other. Each value herein is a value at the room temperature (25° C.).

With the inequality (9) satisfied, the negative lens L38 and the positive lens L39 are situated near each other, and it becomes easier to realize both temperature compensation and correction of various aberrations. In a case where the inequality (9) is unsatisfied, the distance between the negative lens L38 and the positive lens L39 becomes excessively great, so that even in a case where inequalities (11) to (13) described below are satisfied, it is difficult to realize both temperature compensation and correction of various aberrations. According to the present exemplary embodiment, the negative lens L38 and the positive lens L39 are cemented together, so that DAB=0.00.

Further, with the inequality (10) satisfied, the lens surfaces of the negative lens L38 and the positive lens L39 that face each other have substantially the same shape. Thus, even in a case where the negative lens L38 and the positive lens L39 are not cemented together, the pair of the negative lens L38 and the positive lens L39 are still given a function equivalent to a function of a cemented lens. In a case where the inequality (10) is unsatisfied, the difference between the radii of curvature of the lens surfaces of the negative lens L38 and the positive lens L39 that face each other becomes excessively great. This makes it difficult to situate the negative lens L38 and the positive lens L39 near each other to satisfy the inequality (9), and it becomes difficult to realize both temperature compensation and correction of various aberrations. According to the present exemplary embodiment, the negative lens L38 and the positive lens L39 are cemented together, so that RA/RB=1.00.

Further, the optical system according to the present exemplary embodiment satisfies the following inequalities (11) to (13):

$$0.00 \leq |NA-NB| \leq 0.15 \quad (11),$$

$$0.00 \leq |vA-vB| \leq 12.00 \quad (12), \text{ and}$$

$$0.10 \leq |dnA/dt-dnB/dt| \quad (13),$$

where NA is a refractive index of the negative lens L38 at the d-line, NB is a refractive index of the positive lens L39 at the d-line, vA is an Abbe number of the negative lens L38 for the d-line, and vB is an Abbe number of the positive lens L39 for the d-line. Further, dnA/dt [$10^{-6}$/° C.] is a temperature coefficient of the refractive index of the negative lens L38 at the d-line at 20° C. to 40° C., and dnB/dt [$10^{-6}$/° C.] is a temperature coefficient of the refractive index of the positive lens L39 at the d-line at 20° C. to 40° C. Each value herein is a value at the room temperature (25° C.).

The inequalities (11) to (13) indicate that the negative lens L38 and the positive lens L39 are made of different materials from each other and the difference between the refractive indexes of the materials and the difference between the dispersions of the materials are small whereas the difference between the temperature coefficients of the refractive indexes of the materials is great. A commonly-used cemented lens consists of a negative lens and a positive lens that have a great difference in refractive index and a great difference in dispersion, thereby acquiring the function of correcting chromatic aberration and field curvature. On the contrary, according to the present exemplary embodiment, the difference in refractive index and the difference in dispersion between the negative lens L38 and the positive lens L39 are reduced to satisfy the inequalities (11) and (12) so that the third cemented lens L30 has a function equivalent to a single lens at the room temperature. This reduces an effect of the third cemented lens L30 on aberration changes in the optical system in a case where the ambient temperature changes from the room temperature.

Further, the difference between the temperature coefficients of the refractive indexes of the negative lens L38 and the positive lens L39 is increased to satisfy the inequality (13) so that the third cemented lens L30 functions as a cemented lens for the temperature compensation in a case where the ambient temperature changes from the room temperature. Specifically, in a case where the ambient temperature changes from the room temperature, an angle of refraction of light on the cemented surfaces of the negative lens L38 and the positive lens L39 becomes greater than that at the room temperature, and this is used to control the convergence (divergence) of luminous flux with the third cemented lens L30 and to prevent changes in focal point position.

In a case where the inequalities (11) and (12) are unsatisfied, the difference between the refractive indexes of the negative lens L38 and the positive lens L39 and the difference between the dispersions of the negative lens L38 and the positive lens L39 become excessively great, and it becomes difficult to prevent aberration changes in the optical system in a case where the ambient temperature changes from the room temperature. Further, in a case where the inequality (13) is unsatisfied, the difference between the temperature coefficients of the refractive indexes of the negative lens L38 and the positive lens L39 becomes excessively small, and it becomes difficult to prevent changes in focal point position of the optical system in a case where the ambient temperature changes from the room temperature.

As described above, a feature of the optical system according to the present exemplary embodiment is that the inequalities (9) to (13) are simultaneously satisfied. This makes it possible to set conditions such as relative positions, shapes, and materials of the negative lens L38 and the positive lens L39 suitably, and changes in focal point position that originate from a change in ambient temperature are prevented regardless of a sign of a value of a coefficient β of each lens. Furthermore, inequalities (9a) to (13a) are desirably satisfied. More desirably, inequalities (9b) to (13b) are satisfied.

$$0.00 \leq DAB \leq 0.80 \quad (9a),$$

$$0.85 \leq RA/RB \leq 1.15 \quad (10a),$$

$$0.00 \leq |NA-NB| \leq 0.12 \quad (11a),$$

$$0.00 \leq |vA-vB| \leq 11.00 \quad (12a),$$

$$0.50 \leq |dnA/dt-dnB/dt| \quad (13a),$$

$$0.00 \leq DAB \leq 0.60 \quad (9b),$$

$$0.90 \leq RA/RB \leq 1.10 \quad (10b),$$

$$0.00 \leq |NA-NB| \leq 0.10 \quad (11b),$$

$$0.00 \leq |vA-vB| \leq 10.00 \quad (12b), \text{ and}$$

$$1.00 \leq |dnA/dt-dnB/dt| \quad (13b).$$

The negative lens L38 and the positive lens L39 are to be adjacent to each other and can be separated from each other as needed. Even in a case where the lenses are separated from each other, an effect similar to an effect in a case where the lenses are cemented together is produced by sufficiently reducing the distance between the lenses and the difference in shape between the lenses to satisfy the inequalities (9) and (10). Specifically, even in a case where the optical system does not include the third cemented lens L30, a similar effect is still produced in a case where the optical system includes a pair (lens group) of the negative lens L38 and the positive lens L39 that satisfy the inequalities (9) to (13). Further, the order in which the negative lens L38 and the positive lens L39 are arranged and the positions of the negative lens L38 and the positive lens L39 in the optical system can be changed as needed.

Desirably, the lens surfaces (cemented surfaces) of the negative lens L38 and the positive lens L39 of the third cemented lens L30 that face each other are each convex toward the object side. More desirably, the negative lens L38 and the positive lens L39 of the third cemented lens L30 are each convex toward the object side. The foregoing configuration makes it easier to realize temperature compensation and size reduction of the entire system. The same applies to a case where the negative lens L38 and the positive lens L39 of the third cemented lens L30 are separated from each other.

The sign of the focal length of the third cemented lens L30 (combined focal length of the negative lens L38 and the positive lens L39) according to the present exemplary embodiment is positive. Thus, the third cemented lens L30 plays a function similar to those of the third positive lens L18 according to the first exemplary embodiment and the third positive lens L28 according to the second exemplary embodiment at the room temperature. The sign of the focal length of the third cemented lens L30 can be negative depending on the configuration of the optical system.

Figure 6:
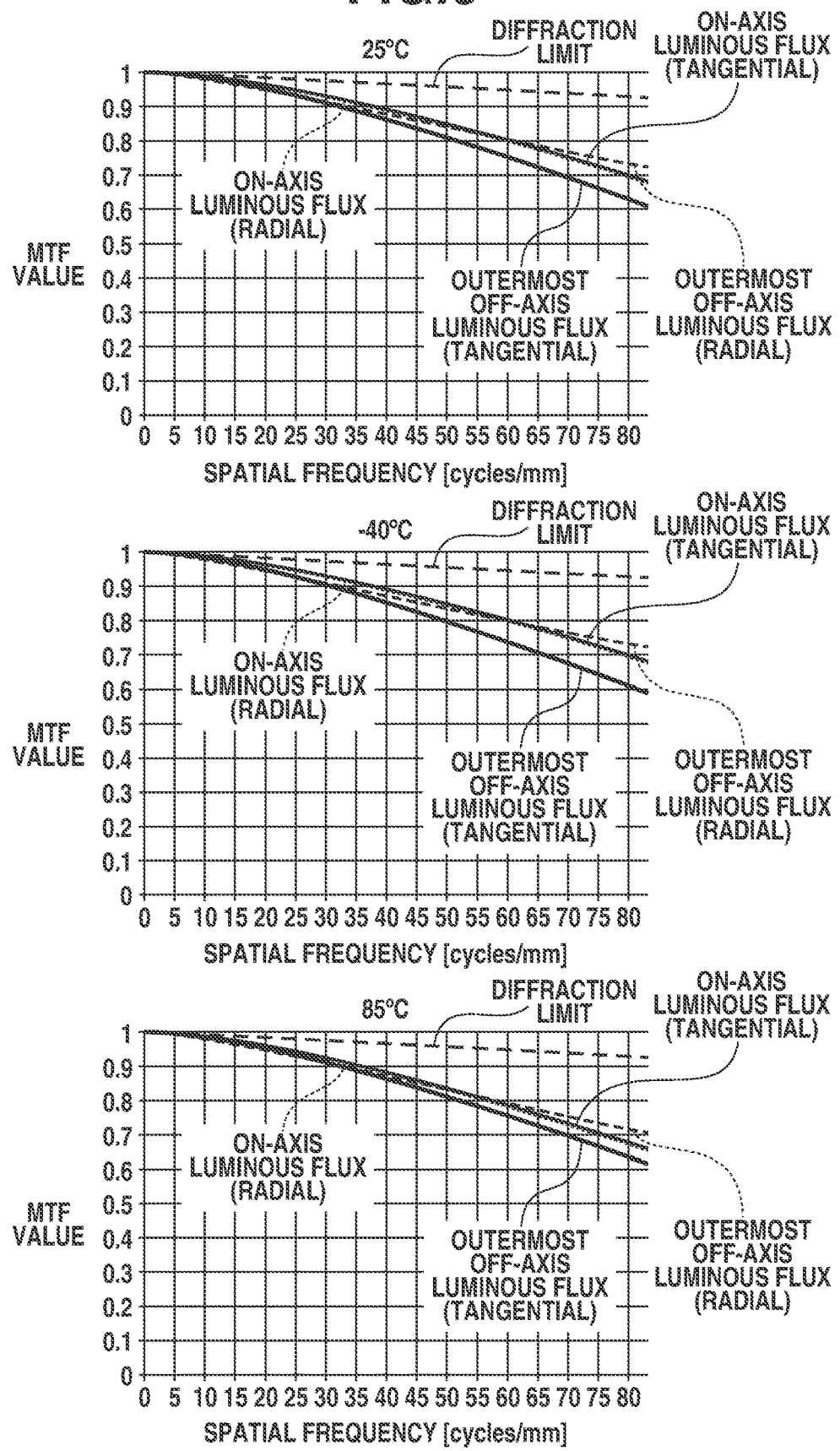
FIG. 6 is a MTF chart of the optical system according to the third exemplary embodiment.

FIG. 6 is a diagram illustrating a MTF curve of the optical system according to the present exemplary embodiment. Three cases where the ambient temperature at which the optical system is situated is the room temperature (25° C.), the low temperature (−40° C.), and the high temperature (85° C.) will be described below. As illustrated in FIG. 6, the minimum MTF value for a spatial frequency of 83 cycles/mm corresponding to the half value of the Nyquist frequency is about 61% at the room temperature (25° C.), so that suitable image forming performance is realized. Further, the minimum MTF value for a spatial frequency of 68 cycles/mm at the low temperature (−40° C.) is about 60%, and the minimum MTF value for a spatial frequency of 68 cycles/mm at the high temperature (85° C.) is about 62%. Specifically, it is understood that the temperature compensation by the third cemented lens L30 makes it possible to maintain suitable image forming performance even in a case where the ambient temperature changes.

Numerical Exemplary Embodiments

First to third numerical examples corresponding to the first to third exemplary embodiments described above will be described below. In each numerical example, a surface number of an optical surface indicates an order of the optical surface counted from an object surface, r [mm] indicates a radius of curvature of the ith optical surface, and d [mm] indicates a distance between the ith optical surface and the (i+1)th optical surface. While materials (glass materials) of OHARA INC. were used as materials of the lenses and materials (glass materials) of Schott were used as materials of filters and cover glasses in the numerical examples, materials of other companies that have equivalent physical properties can be used.

First Numerical Example

| Various Types of Data | |
|---|---|
| Focal Length | 18.7 mm |
| Image Side Fno | 1.2 |
| Angle of View | 30.0° (±15.0°) |
| Design Wavelength | 486.1 nm to 656.27 nm |

| Surface Data | | | |
|---|---|---|---|
| | r | d | Material |
| Object Surface | — | ∞ | |
| S1 | — | 0.0 | |
| L11 | 26.56 | 2.51 | S-TIH6 |
| | 85.75 | 0.19 | |
| L12 | 11.36 | 2.73 | S-LAH60 |
| | 9.23 | 5.07 | |
| L13 | −20.52 | 0.85 | S-NBH56 |
| L14 | 13.51 | 5.98 | S-LAM73 |
| | −18.18 | 1.40 | |
| L15 | −12.35 | 0.81 | S-FTM16 |
| L16 | 29.33 | 5.61 | S-LAH96 |
| | −19.30 | 0.22 | |
| L17 | 15.71 | 5.84 | S-FPM2 |
| | −299.09 | 0.20 | |
| L18 | 39.33 | 9.85 | S-LAH71 |
| | 97.26 | 1.57 | |
| L19 | −18.65 | 0.80 | S-TIH10 |
| | 170.00 | 1.31 | |
| F1 | ∞ | 0.58 | BK7 |
| | ∞ | 0.15 | |
| CG1 | ∞ | 0.50 | BK7 |
| | ∞ | 0.81 | |
| IM1 | — | | |

Second Numerical Example

| Various Types of Data | |
|---|---|
| Focal Length | 18.7 mm |
| Image Side Fno | 1.2 |
| Angle of View | 30.0° (±15.0°) |
| Design Wavelength | 486.1 nm to 656.27 nm |

| Surface Data | | | |
|---|---|---|---|
| | r | d | Material |
| Object Surface | — | ∞ | |
| S2 | — | 0.0 | |
| L21 | 22.68 | 3.19 | S-NPH1W |
| | 49.41 | 0.20 | |
| L22 | 15.52 | 3.97 | S-NPH2 |
| | 11.49 | 3.43 | |
| L23 | −22.97 | 0.80 | S-NBH56 |
| L24 | 10.79 | 6.54 | S-LAM73 |
| | −21.94 | 1.11 | |
| L25 | −15.55 | 0.80 | S-TIM2 |
| L26 | 26.07 | 5.06 | S-LAH59 |
| | −26.40 | 0.20 | |
| L27 | 13.68 | 6.21 | S-FPM2 |
| | 54.08 | 3.63 | |
| L28 | 17.03 | 6.06 | S-LAH95 |
| | 51.55 | 1.99 | |
| L29 | −13.92 | 0.80 | S-NPH2 |
| | −72.23 | 0.95 | |
| F2 | ∞ | 0.58 | N-BK7 |
| | ∞ | 0.15 | |
| CG2 | ∞ | 0.50 | N-BK7 |
| | ∞ | 0.81 | |
| IM2 | — | | |

Third Numerical Example

| Various Types of Data | |
|---|---|
| Focal Length | 16.15 mm |
| Image Side Fno | 1.2 |
| Angle of View | 35.0° (±17.5°) |
| Design Wavelength | 486.1 nm to 656.27 nm |

| | r | d | Material |
|---|---|---|---|
| Surface Data (25° C.) | | | |
| Object Surface | — | ∞ | |
| S3 | — | 0.0 | |
| L31 | 22.64 | 2.95 | S-LAH99_ |
| | 41.85 | 0.20 | |
| L32 | 22.51 | 2.50 | S-BSL7 |
| | 12.17 | 3.56 | |
| L33 | −15.32 | 0.80 | S-TIL26 |
| L34 | 39.86 | 4.21 | S-LAM73 |
| | −17.14 | 1.39 | |
| L35 | −11.49 | 0.80 | S-NBH56 |
| L36 | 46.04 | 5.58 | S-LAH89 |
| | −16.14 | 0.20 | |
| L37 | 16.96 | 5.87 | S-FPM2 |
| | −651.22 | 0.20 | |
| L38 | 29.72 | 1.00 | S-NBH58 |
| L39 | 10.29 | 12.47 | S-LAH60MQ |

-continued

| | | | |
|---|---|---|---|
| | 216.08 | 1.62 | |
| L310 | −14.86 | 0.80 | S-LAH99 |
| | −45.092 | 0.80 | |
| F2 | ∞ | 0.58 | N-BK7 |
| | ∞ | 0.15 | |
| CG2 | ∞ | 0.50 | N-BK7 |
| | ∞ | 0.81 | |
| IM3 | — | | |

Surface Data (−40° C.)

| | | | |
|---|---|---|---|
| Object Surface | — | ∞ | |
| S3 | — | 0.0 | |
| L31 | 22.63 | 2.95 | S-LAH99 |
| | 41.84 | 0.19 | |
| L32 | 22.50 | 2.50 | S-BSL7 |
| | 12.17 | 3.55 | |
| L33 | −15.31 | 0.80 | S-TIL26 |
| L34 | 39.84 | 4.21 | S-LAM73 |
| | −17.13 | 1.39 | |
| L35 | −11.49 | 0.80 | S-NBH56 |
| L36 | 46.02 | 5.58 | S-LAH89 |
| | −16.13 | 0.20 | |
| L37 | 16.95 | 5.86 | S-FPM2 |
| | −650.76 | 0.19 | |
| L38 | 29.70 | 1.00 | S-NBH58 |
| L39 | 10.28 | 12.47 | S-LAH60MQ |
| | 216.12 | 1.62 | |
| L310 | −14.85 | 0.80 | S-LAH99 |
| | −45.07 | 0.80 | |
| F2 | ∞ | 0.58 | N-BK7 |
| | ∞ | 0.15 | |
| CG2 | ∞ | 0.50 | N-BK7 |
| | ∞ | 0.81 | |
| IM3 | — | | |

Surface Data (85° C.)

| | | | |
|---|---|---|---|
| Object Surface | — | ∞ | |
| S3 | — | 0.0 | |
| L31 | 22.65 | 2.95 | S-LAH99 |
| | 41.88 | 0.21 | |
| L32 | 22.52 | 2.50 | S-BSL7 |
| | 12.18 | 3.57 | |
| L33 | −15.33 | 0.80 | S-TIL26 |
| L34 | 39.88 | 4.21 | S-LAM73 |
| | −17.15 | 1.40 | |
| L35 | −11.50 | 0.80 | S-NBH56 |
| L36 | 46.07 | 5.59 | S-LAH89 |
| | −16.15 | 0.20 | |
| L37 | 16.97 | 5.87 | S-FPM2 |
| | −651.72 | 0.21 | |
| L38 | 29.74 | 1.00 | S-NBH58 |
| L39 | 10.29 | 12.48 | S-LAH60MQ |
| | 216.03 | 1.62 | |
| L310 | −14.87 | 0.80 | S-LAH99 |
| | −45.11 | 0.80 | |
| F2 | ∞ | 0.58 | N-BK7 |
| | ∞ | 0.15 | |
| CG2 | ∞ | 0.50 | N-BK7 |
| | ∞ | 0.81 | |
| IM3 | — | | |

The optical systems according to the numerical examples each consist of spherical lenses only. That is to say, the optical systems do not include aspherical surfaces. While every lens surface of the optical systems according to the numerical examples is a spherical surface that is easy to process, the size reduction of the entire system and high optical performance are both realized. One or some of the lens surfaces can be changed to aspherical surfaces as needed.

Further, the optical systems according to the numerical examples are each a fixed focal length optical system with a fixed focal length (that does not perform zooming) and are configured to not perform focusing. Specifically, the distances between the lenses of the optical systems according to the numerical examples are always fixed. This makes it possible to avoid changes in optical performance that originate from movements of the lenses. The optical systems can be configured to perform at least one of zooming and focusing as needed, and the distances between the lenses can be changed for zooming and focusing.

The following table shows values of the inequalities relating to the optical systems according to the exemplary embodiments described above.

TABLE 1

| | | | First Exemplary Embodiment | Second Exemplary Embodiment | Third Exemplary Embodiment |
|---|---|---|---|---|---|
| | f1 | [mm] | 46.90 | 67.80 | 45.76 |
| | f2 | [mm] | −141.21 | −91.14 | −55.96 |
| | f3 | [mm] | −38.77 | −8.50 | −19.41 |
| | f4 | [mm] | 25.13 | 10.00 | 15.61 |
| | f5 | [mm] | −41.96 | −15.60 | −10.69 |
| | f6 | [mm] | 22.38 | 16.80 | 14.64 |
| | f34 | [mm] | 201.31 | −41.74 | 51.74 |
| | f56 | [mm] | 263.52 | −56.39 | −122.68 |
| | ν3 | | 24.80 | 24.80 | 42.82 |
| | ν4 | | 37.09 | 37.09 | 37.09 |
| | ν5 | | 35.31 | 36.26 | 24.80 |
| | ν6 | | 48.49 | 46.62 | 40.78 |
| | N3 | | 1.855 | 1.855 | 1.567 |
| | N4 | | 1.794 | 1.794 | 1.794 |
| | N5 | | 1.593 | 1.620 | 1.855 |
| | N6 | | 1.764 | 1.816 | 1.852 |
| | NA | | — | — | 1.789 |
| | NB | | — | — | 1.834 |
| | νA | | — | — | 28.43 |
| | νB | | — | — | 37.17 |
| | dnA/dt | [10E−06/° C.] | — | — | 4.80 |
| | dnB/dt | [10E−06/° C.] | — | — | −0.10 |
| (1) | |f1/f2| | | 0.33 | 0.74 | 0.82 |
| (2) | |f34/f56| | | 0.76 | 0.74 | 0.42 |
| (3) | f3/f4 | | −1.54 | −0.85 | −1.24 |
| (4) | f5/f6 | | −1.87 | −0.93 | −0.73 |
| (5) | |ν3−ν4| | | 12.29 | 12.29 | 5.73 |

TABLE 1-continued

|  |  |  | First Exemplary Embodiment | Second Exemplary Embodiment | Third Exemplary Embodiment |
|---|---|---|---|---|---|
| (6) | \|v5-v6\| |  | 13.18 | 10.36 | 15.98 |
| (7) | \|N3-N4\| |  | 0.061 | 0.061 | 0.226 |
| (8) | \|N5-N6\| |  | 0.171 | 0.196 | 0.003 |
| (9) | DAB | [mm] | — | — | 0.00 |
| (10) | RA/RB |  | — | — | 1.00 |
| (11) | \|NA-NB\| |  | — | — | 0.045 |
| (12) | \|vA-vB\| |  | — | — | 8.74 |
| (13) | \|dnA/dt-dnB/dt\| | [10E−06/° C.] | — | — | 4.90 |

[Imaging Apparatus]

Figure 7:
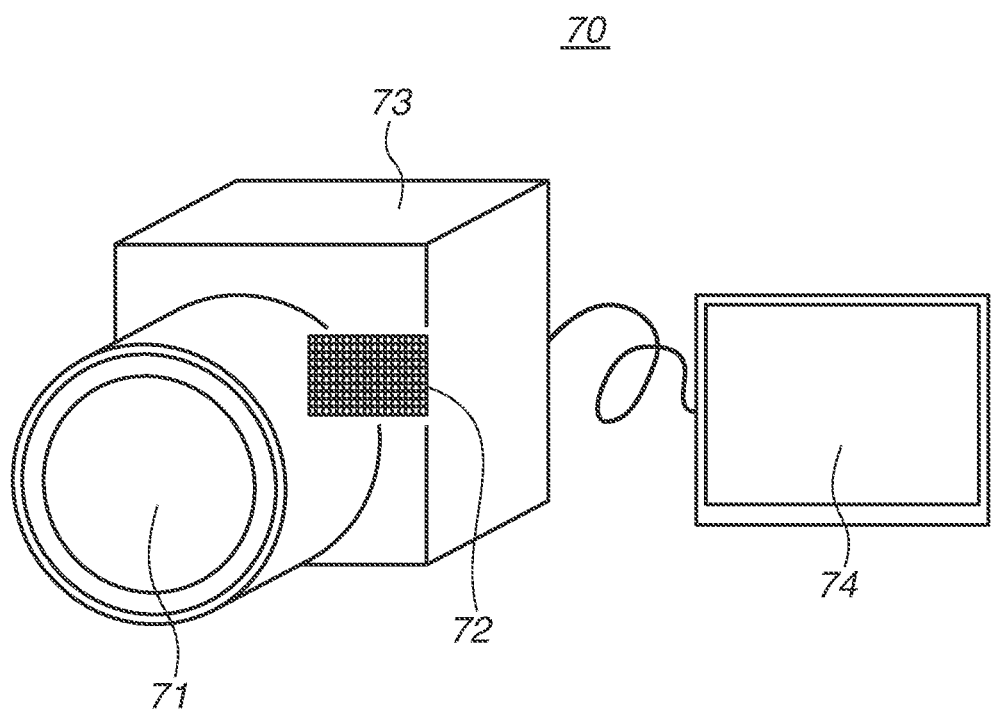
FIG. 7 is a diagram schematically illustrating an imaging apparatus according to an exemplary embodiment.

FIG. 7 is a schematic diagram illustrating a major portion of an imaging apparatus 70 according to an exemplary embodiment. The imaging apparatus 70 according to the present exemplary embodiment includes an optical system (imaging optical system) 71 according to any one of the above-described exemplary embodiments, a photodetector 72, and a camera body (housing) 73. The photodetector 72 photoelectrically converts an object image formed by the optical system 71. The camera body 73 holds the photodetector 72. The optical system 71 is held by a lens tube (holding member) and is connected to the camera body 73. As illustrated in FIG. 7, a display unit 74 for displaying images acquired by the photodetector 72 can be connected to the camera body 73. An image sensor (photoelectric conversion element) such as a charge-coupled device (CCD) sensor or a complementary metal oxide semiconductor (CMOS) sensor can be used as the photodetector 72.

In a case where the imaging apparatus 70 is used as a distance measurement apparatus, for example, an image sensor (imaging surface phase difference sensor) including pixels capable of dividing luminous flux from an object into two portions and performing photoelectric conversion on the divided portions can be used as the photodetector 72. In a case where a subject is on a front focal surface of the optical system 71, no misalignment of images corresponding to the two divided portions of the luminous flux occurs on an image plane of the optical system 71. On the other hand, in a case where a subject is at a position other than the front focal surface of the optical system 71, misalignment of the images occurs. In this case, the misalignment of the images corresponds to an amount of displacement of the subject from the front focal surface, so that a distance to the subject can be measured by acquiring an amount and direction of misalignment of the images using the imaging surface phase difference sensor.

The optical system 71 and the camera body 73 can be configured to be attachable to and detachable from each other. Specifically, the optical system 71 and the lens tube can be configured as an interchangeable lens (lens apparatus). Further, the optical systems according to the exemplary embodiments are applicable to not only imaging apparatuses such as digital still cameras, cameras for silver-halide films, video cameras, in-vehicle cameras, and monitoring cameras but also various optical apparatuses such as telescopes, binoculars, projectors (projection apparatuses), and digital copy machines.

[In-Vehicle System]

Figure 8:
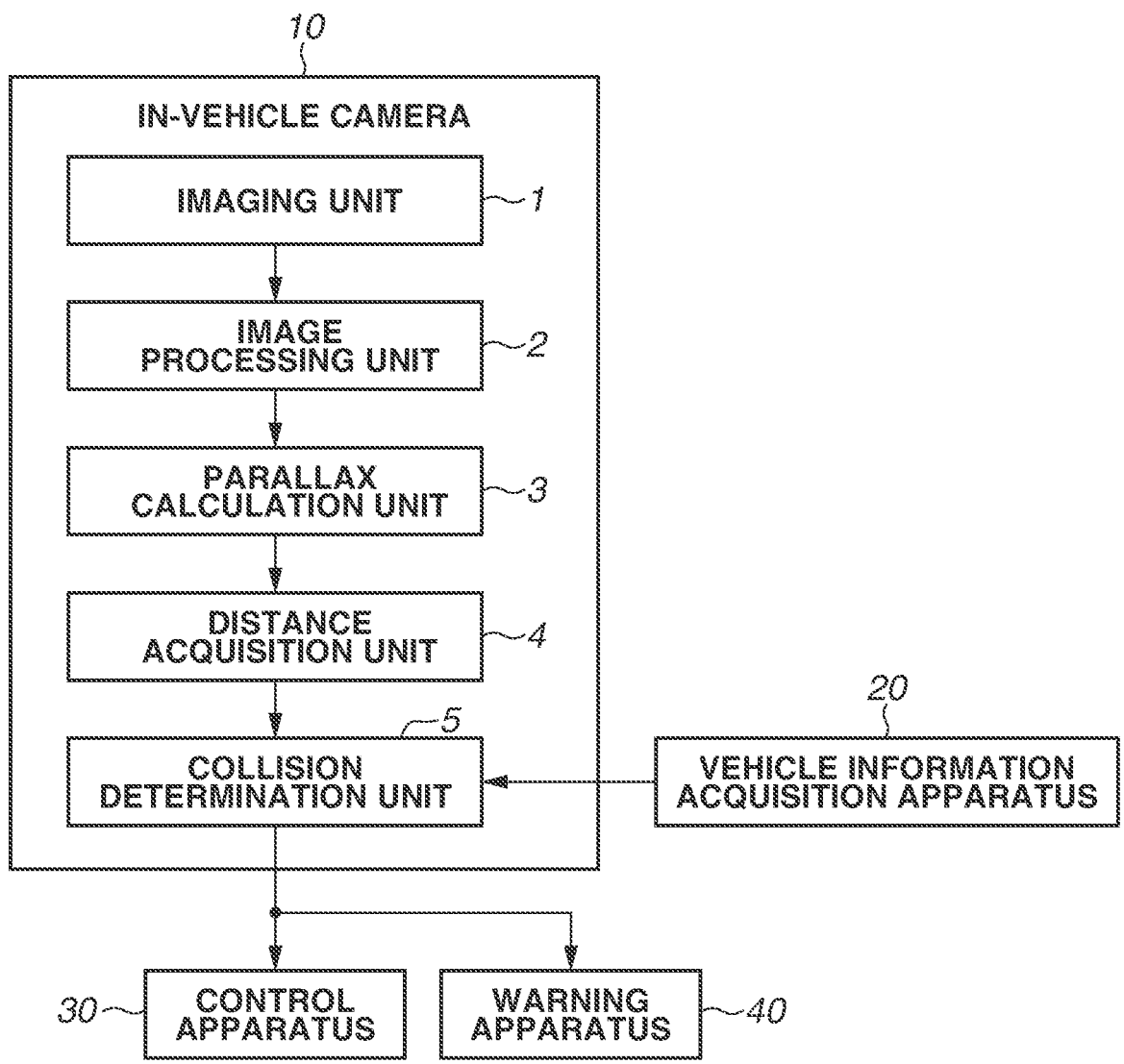
FIG. 8 is a functional block diagram illustrating an in-vehicle system according to an exemplary embodiment.
Figure 9:
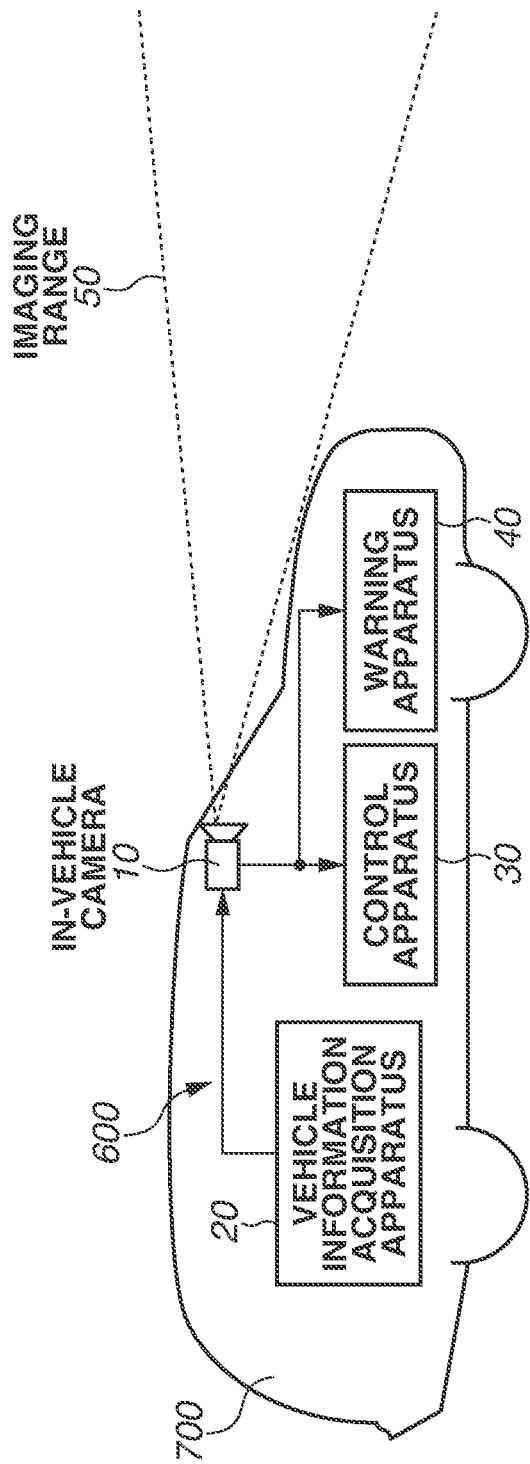
FIG. 9 is a diagram schematically illustrating a vehicle according to an exemplary embodiment.

FIG. 8 is a diagram illustrating a configuration of an in-vehicle camera 10 and an in-vehicle system (driver assistance apparatus) 600 including the in-vehicle camera 10 according to the present exemplary embodiment. The in-vehicle system 600 is a system that is held by a movable object (moving apparatus) such as an automobile (vehicle) and assists in the driving (operating) of the vehicle based on image information about an area around the vehicle that is acquired by the in-vehicle camera 10. FIG. 9 is a schematic diagram illustrating a vehicle 700 as a moving apparatus including the in-vehicle system 600. While FIG. 9 illustrates a case where an imaging range 50 of the in-vehicle camera 10 is set on a front side of the vehicle 700, the imaging range 50 can be set on a rear or lateral side of the vehicle 700.

As illustrated in FIG. 8, the in-vehicle system 600 includes the in-vehicle camera 10, a vehicle information acquisition apparatus 20, a control apparatus (control unit, electronic control unit (ECU)) 30, and a warning apparatus (warning unit) 40. Further, the in-vehicle camera 10 includes an imaging unit or circuit 1, an image processing unit or circuit 2, a parallax calculation unit or circuit 3, a distance acquisition unit (acquisition unit) or circuit 4, and a collision determination unit or circuit 5. The image processing unit 2, the parallax calculation unit 3, the distance acquisition unit 4, and the collision determination unit 5 form a processing unit. The imaging unit 1 includes the optical system according to any one of the above-described exemplary embodiments and an imaging surface phase difference sensor.

Figure 10:
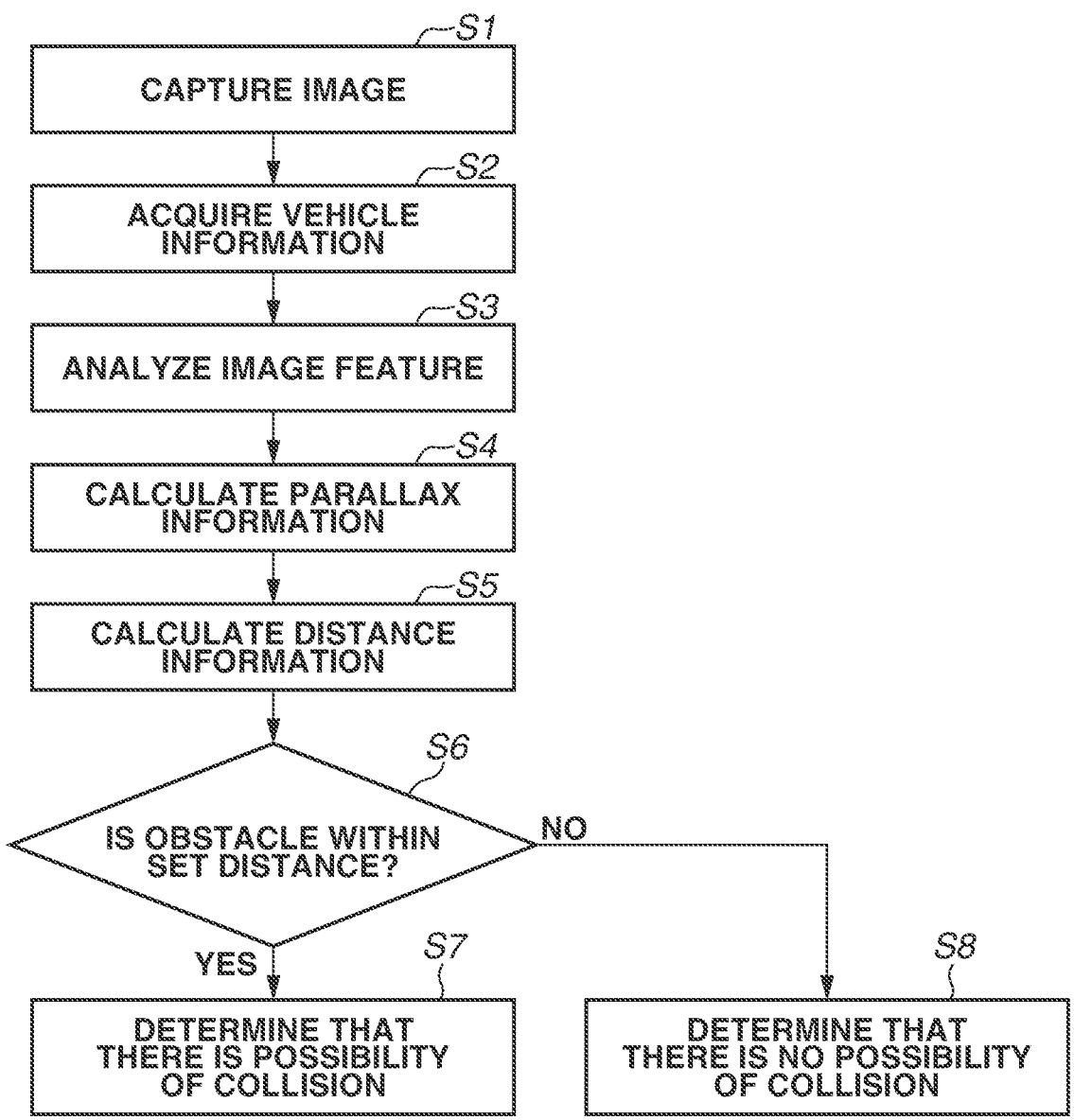
FIG. 10 is a flowchart illustrating an example of operations of an in-vehicle system according to an exemplary embodiment.

FIG. 10 is a flowchart illustrating an example of operations of the in-vehicle system 600 according to the present exemplary embodiment. Operations of the in-vehicle system 600 will be described below with reference to the flowchart.

First, in operation S1, the imaging unit 1 images a target object (subject) such as an obstacle or a pedestrian near the vehicle and acquires a plurality of pieces of image data (parallax image data).

Further, in operation S2, the vehicle information acquisition apparatus 20 acquires vehicle information. The vehicle information is information including a velocity, a yaw rate, and a rudder angle of the vehicle.

In operation S3, the image processing unit 2 performs image processing on the plurality of pieces of image data acquired by the imaging unit 1. Specifically, an image feature analysis is performed to analyze feature amounts such as an edge amount, an edge direction, and a density value in the image data. The image feature analysis can be performed on each of the plurality of pieces of image data or can be performed on only some of the plurality of pieces of image data.

In operation S4, the parallax calculation unit 3 calculates parallax (image misalignment) information between the plurality of pieces of image data acquired by the imaging unit 1. A known method such as a sequential similarity detection algorithm (SSDA) or an area correlation method can be used in calculating parallax information, so that descriptions thereof are omitted herein. Operations S2, S3, and S4 can be performed in this order or can be performed in parallel.

In operation S5, the distance acquisition unit 4 acquires (calculates) distance information about the distance to the target object imaged by the imaging unit 1. The distance information is calculated based on the parallax information calculated by the parallax calculation unit 3 and internal and external parameters of the imaging unit 1. The distance information herein refers to information about a relative position to the target object such as the distance to the target object, the defocus amount, and the image misalignment amount and can be information that directly indicates a distance value of the target object in the images or can be information that indirectly indicates information corresponding to the distance value.

Then, in operation S6, the collision determination unit 5 determines whether the distance to the target object is within a set distance range that is set in advance using the vehicle information acquired by the vehicle information acquisition apparatus 20 and the distance information calculated by the distance acquisition unit 4. This determines whether the target object is within the set distance around the vehicle and determines the possibility of a collision between the vehicle and the target object. In a case where the target object is within the set distance (YES in operation S6), in operation S7, the collision determination unit 5 determines that "there is a possibility of a collision", whereas in a case where the target object is not within the set distance (NO in operation S6), in operation S8, the collision determination unit 5 determines that "there is no possibility of a collision".

Next, in a case where the collision determination unit 5 determines that "there is a possibility of a collision", this determination result is notified (transmitted) to the control apparatus 30 and the warning apparatus 40. In this case, the control apparatus 30 controls the vehicle based on the determination result by the collision determination unit 5 in operation S6, and the warning apparatus 40 provides a warning to a user (driver, passenger) of the vehicle based on the determination result by the collision determination unit 5 in operation S7. The notification of the determination result is to be provided to at least one of the control apparatus 30 and the warning apparatus 40.

The control apparatus 30 controls movements of the vehicle by outputting control signals to driving units (engine, motor) of the vehicle. For example, the control apparatus 30 performs control to reduce an engine output and a motor output by generating control signals for applying a brake on the vehicle, releasing an accelerator, turning a steering wheel, and applying a braking force to wheels. Further, the warning apparatus 40 provides a warning to the user by, for example, producing a warning sound (alarm), displaying warning information on a screen of a car navigation system, or vibrating a safety belt or a steering.

As described above, the in-vehicle system 600 according to the present exemplary embodiment performs the above-described process to detect the target object effectively, thereby making it possible to avoid a collision between the vehicle and the target object. Particularly, the application of the optical system according to an exemplary embodiment described above to the in-vehicle system 600 makes it possible to perform the target object detection and the collision determination over a wide angle of view while reducing the size of the entire in-vehicle camera 10 to increase the flexibility of layout.

While the present exemplary embodiment intends the in-vehicle camera 10 that includes only one imaging unit 1 including an imaging surface phase difference sensor, the present exemplary embodiment is not limited to this configuration, and a stereo camera including two imaging units can be used as the in-vehicle camera 10. In this case, the two synchronized imaging units can simultaneously acquire image data, and a process similar to the above-described process can be performed using the two pieces of image data without using the imaging surface phase difference sensor. The two imaging units do not have to be synchronized with each other in a case where the difference in imaging time between the two imaging units is known.

Further, there are various possible exemplary embodiments for the distance information calculation. A case where a pupil-division image sensor including a plurality of pixel portions that are regularly arrayed two-dimensionally is used in the imaging unit 1 will be described below as an example. Each pixel portion of the pupil-division image sensor consists of a microlens and a plurality of photoelectric conversion units, receives a pair of light rays traveling through different regions of the pupil of the optical system, and outputs a pair of image data from each photoelectric conversion unit.

Then, an image misalignment amount of each region is calculated by calculating a correlation between the pair of image data, and the distance acquisition unit 4 calculates image misalignment map data indicating a distribution of image misalignment amounts. Alternatively, the distance acquisition unit 4 can further convert the image misalignment amounts into defocus amounts to generate defocus map data indicating a distribution of defocus amounts (distribution on a two-dimensional plane of the captured images). Further, the distance acquisition unit 4 can acquire distance map data on the distance to the target object that is acquired by converting the defocus amounts.

Further, the in-vehicle system 600 and the moving apparatus 700 can include a notification apparatus (notification unit) for providing a notification of a collision to a manufacturer of the in-vehicle system 600 or a seller of the moving apparatus 700 in a case where the moving apparatus 700 collides with an obstacle. For example, a notification apparatus that transmits information (collision information) about a collision between the moving apparatus 700 and an obstacle to a preset external notification destination via email can be used.

As described above, with the notification apparatus that automatically provides a notification of collision information, an inspection service and/or a repair service can be promptly provided after a collision occurs. Notification destinations of collision information can be an insurance company, a medical institution, a police station, and a destination that is set by the user. Further, the notification apparatus can be configured to provide notifications of not only collision information but also malfunction information about components and consumable information about consumables to the notification destinations. The collision detection can be performed using distance information acquired based on an output from the photodetection unit 2 or can be performed by another detection unit (sensor).

While the in-vehicle system 600 is applied to the driver assistance (collision damage reduction) according to the present exemplary embodiment, the present exemplary embodiment is not limited to the above-described application, and the in-vehicle system 600 can be applied to cruise control (including cruise control with all-speed tracking function) or automated driving. Further, the in-vehicle system 600 is applicable to not only vehicles such as automobiles but also other moving objects such as ships, aircraft, and industrial robots. Further, applications to various devices that use object recognition such as an intelligent transport system (ITS) as well as moving objects are also possible.

Modified Examples

While various exemplary embodiments and examples of the embodiments are described above, the disclosure is not limited to the exemplary embodiments and examples described above, and various combinations, modifications, and changes are possible within the spirit of the disclosure.

For example, while a case where a second control unit has a function as a collision determination unit (determination unit) according to an exemplary embodiment is described above, the disclosure is not limited to the case. For example, an in-vehicle system can include the collision determination unit separately from the second control unit. Specifically, the second control unit is to include at least a function as a distance calculation unit (distance information acquisition unit). Further, a first control unit and the second control unit can be provided outside the imaging apparatus (e.g., inside the vehicle) as needed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-042500, filed Mar. 17, 2022, which is hereby incorporated by reference herein in its entirety.

What is claimed is:

1. An optical system comprising:
an aperture stop closest to an object; and
a plurality of lenses,
wherein the plurality of lenses includes a first positive lens convex toward an object side, a first negative lens convex toward the object side, a first cemented lens, and a second cemented lens arranged consecutively in this order from the object side to an image side, and
wherein the first cemented lens and the second cemented lens each include a negative lens concave toward the object side and a positive lens cemented to the negative lens, and the negative lens and the positive lens are arranged in this order from the object side to the image side.

2. The optical system according to claim 1, wherein the following inequalities are satisfied:

$0.15<|f1/f2|<1.05$; and $0.15<|f34/f56|<1.05$, where f1 is a focal length of the first positive lens, f2 is a focal length of the first negative lens, f34 is a focal length of the first cemented lens, and f56 is a focal length of the second cemented lens.

3. The optical system according to claim 1, wherein the following inequalities are satisfied:

$-2.50<f3/f4<-0.40$; and $-2.50<f5/f6<-0.40$, where f3 is a focal length of the negative lens of the first cemented lens, f4 is a focal length of the positive lens of the first cemented lens, f5 is a focal length of the negative lens of the second cemented lens, and f6 is a focal length of the positive lens of the second cemented lens.

4. The optical system according to claim 1, wherein the following inequalities are satisfied:

$2.0<|v3-v4|<18.0$; and $6.0<|v5-v6|<20.0$, wherein v3 is an Abbe number of the negative lens of the first cemented lens for a d-line, v4 is an Abbe number of the positive lens of the first cemented lens for the d-line, v5 is an Abbe number of the negative lens of the second cemented lens, and v6 is an Abbe number of the positive lens of the second cemented lens.

5. The optical system according to claim 1, wherein the following inequalities are satisfied:

$0.015<|N3-N4|<0.500$; and $0.000<|N5-N6|<0.450$, where N3 is a refractive index of the negative lens of the first cemented lens at a d-line, N4 is a refractive index of the positive lens of the first cemented lens at the d-line, N5 is a refractive index of the negative lens of the second cemented lens, and N6 is a refractive index of the positive lens of the second cemented lens.

6. The optical system according to claim 1, wherein the plurality of lenses includes a second positive lens, a third positive lens, and a second negative lens arranged in this order from the object side to the image side, and the second positive lens, the third positive lens, and the second negative lens are closer to an image than the second cemented lens.

7. The optical system according to claim 1, wherein the plurality of lenses includes a second positive lens, a third cemented lens, and a second negative lens arranged in this order from the object side to the image side, the second positive lens, the third cemented lens, and the second negative lens being closer to an image than the second cemented lens.

8. The optical system according to claim 1,
wherein the plurality of lenses includes a negative lens and a positive lens adjacent to each other, the negative lens and the positive lens being closer to an image than the second cemented lens,
wherein the following inequalities are satisfied:

$0.00 \leq DAB \leq 1.00$; and $0.80 \leq RA/RB \leq 1.20$, where DAB [mm] is a distance on an optical axis between the negative lens and the positive lens adjacent to each other, RA is a radius of curvature of a lens surface of the negative lens, and RB is a radius of curvature of a lens surface of the positive lens, the negative lens and the positive lens being adjacent to each other and the lens surface of the negative lens and the lens surface of the positive lens facing each other, and
wherein the following inequalities are satisfied:

$0.00 \leq |NA-NB| \leq 0.15$;

$0.00 \leq |vA-vB| \leq 12.00$; and $0.10 \leq |dnA/dt - dnB/dt|$, where NA is a refractive index of the negative lens at a d-line, NB is a refractive index of the positive lens at the d-line, vA is an Abbe number of the negative lens for the d-line, vB is an Abbe number of the positive lens for the d-line, dnA/dt$[10^{-6}$/° C.] is a temperature coefficient of the refractive index of the negative lens at the d-line at 20° C. to 40° C., and dnB/dt$[10^{-6}$/° C.] is a temperature coefficient of the refractive index of the positive lens at the d-line at 20° C. to 40° C., the negative lens and the positive lens being adjacent to each other.

9. The optical system according to claim 1, wherein each cemented surface of the first cemented lens and the second cemented lens is convex toward the object side.

10. The optical system according to claim 1, wherein every lens surface of the optical system is a spherical surface.

11. An imaging apparatus comprising the optical system according to claim 1 and an image sensor configured to image an object via the optical system.

12. An in-vehicle system comprising the imaging apparatus according to claim 11 and a determination unit configured to determine a possibility of a collision between a vehicle and the object based on distance information about the object that is acquired by the imaging apparatus.

13. The in-vehicle system according to claim 12, further comprising a control apparatus configured to output a control signal that causes a driving unit of the vehicle to generate a braking force in a case where it is determined that there is a possibility of a collision between the vehicle and the object.

14. The in-vehicle system according to claim 12, further comprising a warning apparatus configured to provide a warning to a user of the vehicle in a case where it is determined that there is a possibility of a collision between the vehicle and the object.

15. The in-vehicle system according to claim 12, further comprising a notification apparatus configured to provide a notification of information about a collision between the vehicle and the object externally.

16. A moving apparatus comprising the imaging apparatus according to claim 11 and configured to move with the imaging apparatus held by the moving apparatus.

17. The moving apparatus according to claim 16, further comprising a determination unit configured to determine a possibility of a collision with the object based on distance information about the object that is acquired by the imaging apparatus.

18. The moving apparatus according to claim 17, further comprising a control unit configured to output a control signal that controls a movement in a case where it is determined that there is a possibility of a collision with the object.

19. The moving apparatus according to claim 17, further comprising a warning unit configured to provide a warning to a user of the moving apparatus in a case where it is determined that there is a possibility of a collision with the object.

20. The moving apparatus according to claim 16, further comprising a notification unit configured to provide a notification of information about a collision with the object externally.

* * * * *